Oct. 27, 1931.  C. W. VOGT  1,828,853
PROCESS AND APPARATUS FOR COOLING OR FREEZING ICE CREAM AND THE LIKE
Filed Oct. 21, 1927
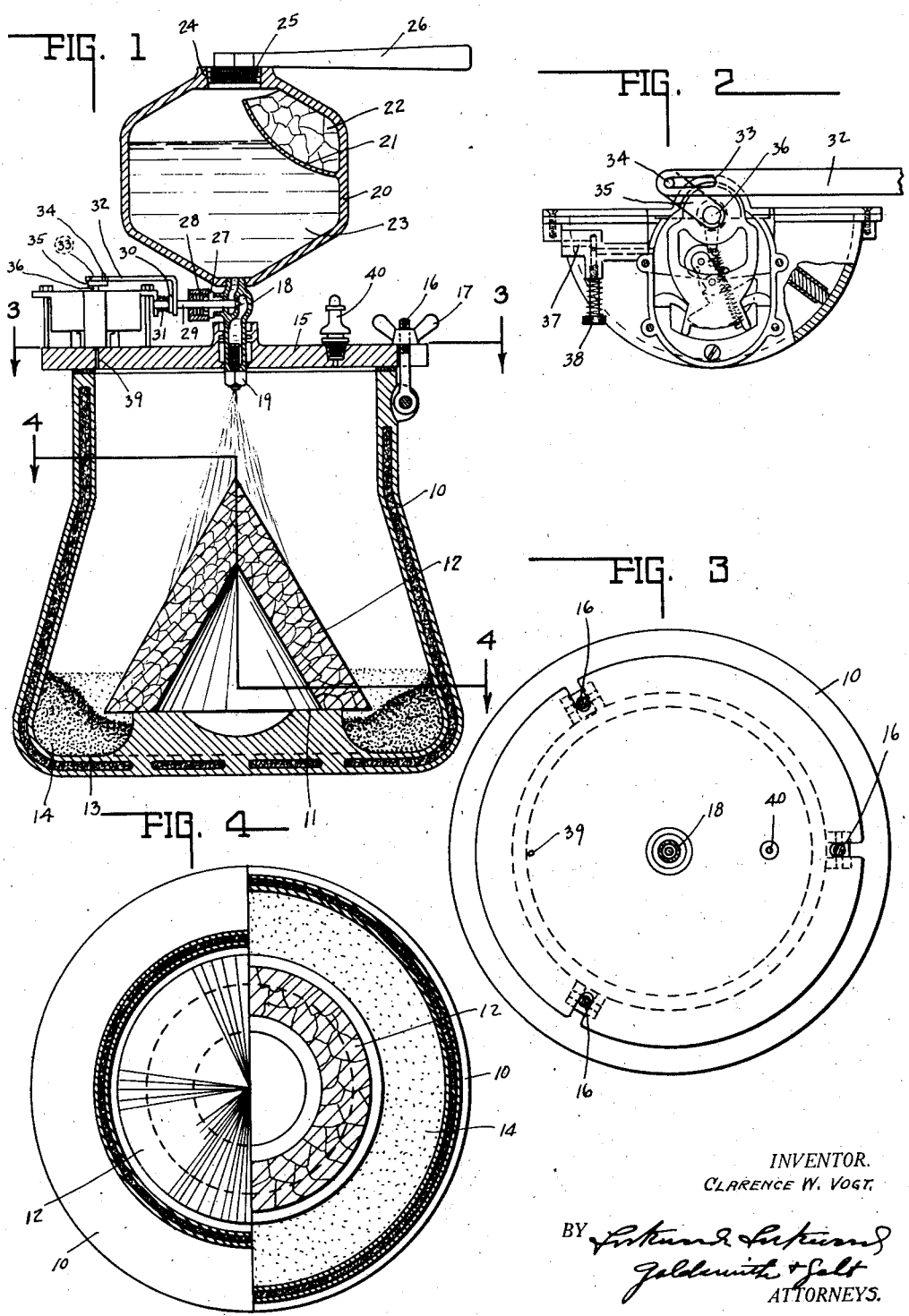
INVENTOR.
CLARENCE W. VOGT.
BY
ATTORNEYS.

Patented Oct. 27, 1931

1,828,853

UNITED STATES PATENT OFFICE

CLARENCE W. VOGT, OF LOUISVILLE, KENTUCKY, ASSIGNOR TO VOGT INSTANT FREEZERS, INC., OF LOUISVILLE, KENTUCKY, A CORPORATION

PROCESS AND APPARATUS FOR COOLING OR FREEZING ICE CREAM AND THE LIKE

Application filed October 21, 1927. Serial No. 227,667.

This invention relates to a new and novel process and apparatus for cooling or freezing liquid substance, and particularly ice cream, ices, sherbets and the like.

It is now known that a product is commercially available which consists of carbon dioxide in solid form so that solid blocks or cakes thereof are commercially obtainable. This product may be formed in any shape and has the properties of any other solid substance. Its refrigerating properties are highly efficient, since its "melting", or rather evaporating temperature is 146 degrees Fahrenheit lower than that of ordinary ice. Therefore, products which are required to be frozen can be kept in their frozen state without the addition of salt as with ordinary ice. One pound of solidified carbon dioxide has substantially twice the refrigerating capacity of a pound of ordinary ice. It has many of the properties of ordinary ice and may be used as a more efficient substitute therefor. It eliminates the use of salt and decreases the requirements over ordinary ice as to weight and volume. It lasts longer and may be more readily handled since its "melting" is not so readily effected or attacked by the temperature of the atmosphere. Furthermore, it always remains dry and clean and eliminates forming liquid when "melting", but, instead of producing liquid, it evaporates into carbon dioxide gas, which has also the added advantage of being slightly germicidal in its nature, which is useful in certain cases.

The principal object of this invention is to utilize solidified $CO_2$ or other substance passing into a gaseous state below the freezing point of the liquid to be frozen for freezing sherbets, ice cream, ices and the like either for commercial purposes or in small quantities for home consumption.

The principal feature of the invention resides in providing a spray nozzle for spraying or discharging a mist of the ice cream mix directly upon the surface of the solidified $CO_2$, causing the small particles thereof to entrain some of the gas and become partly frozen by reason of the cold atmosphere thru which it passes, and thereafter becoming completely frozen and hardened immediately upon contact with the cold surface thereof from which it falls to a container in a dry powdered form. It may be retained in this form for an appreciable length of time, or removed for use. Ice cream formed in this manner is unusually light and fluffy in its texture and acquires a high percentage of over-run.

Another feature of the invention resides in the provision of an intermittently actuated valve for causing the spray to be discharged periodically or intermittently on to the surface of the solidified $CO_2$ so that there will not be an accumulation or film built thereupon.

A further feature of the invention resides in the provision of a mix chamber in which pressure is obtained for forcing the mix thru the spray nozzle by means of evaporation of crushed pieces of solidified $CO_2$ contained in a suitable pocket therein. The "melting" or evaporation of the solidified $CO_2$ therein forms carbon dioxide gas, the expansion of which creates sufficient pressure to force the liquid mix thru the spray nozzle under sufficient pressure for the required purpose.

Other features and advantages of the invention will be more fully set out in the following specifications and claims.

The full nature of the invention will be understood from the accompanying drawings and the following description and claims:

In the drawings Fig. 1 is a central vertical section thru the freezing apparatus. Fig. 2 is a central vertical section thru the intermittent control for the valve. Fig. 3 is a section taken on the line 3—3 of Fig. 1. Fig. 4 is a section taken on the line 4—4 of Fig. 1.

In the drawings there is shown a freezing container 10 which may be suitably insulated in the usual manner as in thermos jars or the like. Said freezing container is provided with an upwardly extending false bottom 11 mounted on the bottom thereof for supporting a cake of solidified $CO_2$ 12. As herein shown, the cake is cone-like in shape with a hollow interior and presents a sloping surface toward the top of the freezing chamber. The false bottom 11 forms with the inner walls of the container an annular space 13 for receiving the frozen particles of ice cream or the like, as indicated at 14. Spaced above the uppermost portion of the cake of the substance 12 there is a cover or closure 15, which is hermetically sealed over the top of the container by the bolts 16 and wing nuts 17, whereby the cover may be readily removed.

Supported upon the cover there is a valve housing 18 extending thru the central portion of the cover and having a spray or misting nozzle 19 connected therewith so as to discharge a mist-like spray directly over the top of the substance 12.

Connected to the upper end of the valve housing 18, there is a mix chamber 20 which may also be considered as a pressure chamber. Said chamber is in communication with the passage thru the valve housing 18. Formed within the upper portion of the chamber, there is a pocket 21 for containing small broken pieces of the substance 12 as indicated at 22. The liquid mix 23 is poured into the chamber thru the opening 24 at the top, which is then closed and sealed by the screw-threaded plug 25, having a handle 26 formed thereon for tightening and loosening the same.

The passage thru the valve housing 18 is controlled by the valve 27 extending thru the packing 28 and connected with the valve stem 29, said stem having a head 30 thereon, against which spring pressure is exerted by the spring 31 for normally holding the valve in closed position.

For intermittently opening the valve, there is an arm 32 engaging the head 30 for drawing the valve to open position against the pressure of the spring 31. Said arm is provided with an elongated slot 33 for slidably receiving the pin 34 on the crank arm 35. Said crank arm is keyed to the shaft 36 which is rotated alternately first in one direction and then the other by the pressure-exerting mechanism of the usual character as now marketed for windshield wipers by the Perfection Products Company, of Detroit, Michigan, and as illustrated in Fig. 2, said mechanism being provided with a gas outlet 37 controlled by the valve 38. Said mechanism is secured to the top of the cover 15 which is provided with a passage 39 extending therethru and communicating with the actuating mechanism illustrated in Fig. 2. Also mounted in the cover 15 there is a relief valve 40 for relieving the pressure of the gas accumulating in the freezing chamber upon its reaching a predetermined pressure.

In operation, a quantity of solidified $CO_2$, preferably in a cone-like form, is mounted in the freezing chamber while the cover is removed and supported upon the false bottom 11. The cover is then mounted in place and securely tightened. Small pieces of solidified $CO_2$ is then placed in the pocket 21 of the mix chamber and a given quantity of ice cream mix is then poured in thru the top. For the purpose of illustration, it may be assumed that the mix chamber shown herein will contain three pints of mix. The plug 25, is then screwed in place and the freezing action begins without further manual operation or manipulation.

Upon the mix chamber being sealed, the crushed solidified $CO_2$ will begin to "melt" or evaporate so as to produce carbon dioxide gas. The expansion of the gas creates a pressure therein which intermittently forces the mix thru the valve housing 18. This is by reason of the fact that the reciprocating valve 27 is put into operation thru the pressure of the gas which has already formed in the freezing chamber. The pressure increases in the chamber until the mix is forced thru the spray nozzle 19 which is so formed as to break up the molecules and cause a very fine misty spray to be discharged directly on the surface of the solidified $CO_2$. During the passage of the small particles of mist-like spray thru the air of the chamber, which has been lowered in temperature by the introduction of the solidified $CO_2$ therein, there will be a partial freezing of the mist incorporating some air therein. Upon the partially frozen and air-saturated particles impinging upon the surface of the solidified $CO_2$ they will become further frozen to a hardened solid state and will roll off into the containing chamber at bottom.

The intermittent spraying of the mix is desirable to prevent the formation of a film or coating of the frozen mix upon the surface of the solidified $CO_2$. By reason of the intermittent discharge thereon the surface of the solidified $CO_2$ will be swept clean at each discharge so that all particles of the spray will impinge directly against the freezing surface of the solidified $CO_2$.

This action continues until all the mix is discharged from the mix chamber and the frozen ice cream will be in a dry powder-like form at the bottom of the freezing chamber. If desired, the frozen mix may be kept therein an appreciable time until used, since there would be enough solidified $CO_2$ left to maintain it in its dry, hardened state. However, the frozen ice cream can be immediately removed by taking off the lid of cover 15 and dumping it out into a suitable container. The remaining solidified $CO_2$ may then be replaced and the operation repeated until the solidified $CO_2$ contained therein has been used up.

It has been found advisable to use approximately five pounds of solidified $CO_2$ in the cone for the freezing of approximately three pints of mix, which will produce approximately three quarts of ice cream. However, there will be sufficient solidified $CO_2$ left to freeze a second batch if desired, or the remainder may be used to maintain the cream in its frozen state for a period of time.

While the invention has been described herein with respect to a small household device, it may be likewise applied, with slight modification, to the commercial manufacture of ice cream, either in batches or continuously.

While the invention has been described herein as employing solidified carbon dioxide having an evaporative surface at a low temperature of about 146 degrees Fahrenheit lower than that of ordinary ice, it will be obvious that any similar substance having an evaporative surface of low temperature may be employed in a like manner, so long as the gas given off thereby is not harmful to the product.

The invention claimed is:

1. The process of cooling or freezing liquids consisting in discharging said liquid upon the surface of a refrigerant which rapidly changes to the gaseous state below the temperature at which it is desired to cool or freeze said liquid.

2. The process of cooling or freezing a liquid consisting in discharging the liquid upon a solidified refrigerant which passes into the gaseous state without immediate liquefaction.

3. The process of cooling or freezing a liquid consisting in discharging the liquid upon the surface of solidified carbon dioxide.

4. The process of cooling or freezing liquids consisting in discharging the liquid in a spray within a refrigerating chamber and causing said spray to impinge directly upon the surface of a solidified refrigerant which passes into the gaseous state without immediate liquefaction.

5. The process of cooling or freezing liquids consisting in discharging a liquid in the form of a spray within a refrigerating chamber and causing said spray to impinge directly upon the surface of a refrigerant which rapidly changes to the gaseous state below the temperature at which it is desired to cool or freeze said liquid.

6. The process of cooling or freezing a liquid consisting in discharging the same in the form of a fine spray upon a surface of solidified carbon dioxide.

7. The process of cooling or freezing a liquid consisting in discharging the same diagonally upon the surface of a solidified refrigerant which passes into the gaseous state without immediate liquefaction.

8. The process of cooling or freezing a liquid consisting in intermittently discharging said liquid upon the surface of a refrigerant which rapidly changes to a gaseous state below the temperature at which it is desired to cool or freeze said liquid.

9. The process of freezing liquids consisting of discharging the liquid in the form of a fine spray into a refrigerating chamber so as to cause said liquid to be partially frozen by the atmosphere therein with the incorporation of a portion of said atmosphere in said partially frozen liquid, and thereafter causing said partially frozen liquid to impinge upon the surface of a refrigerant which rapidly changes to the gaseous state below the temperature at which it is desired to freeze said liquid for further freezing and hardening the same.

10. The process of freezing a liquid consisting in placing the same in a mixing chamber with a quantity of solidified carbon dioxide for creating a pressure in said chamber through sublimation and expansion of said carbon dioxide, discharging said liquid in the form of a spray under the pressure exerted thereon in said mixing chamber, and causing said spray to discharge directly upon the surface of a quantity of solidified carbon dioxide so as to become frozen and hardened upon impact therewith.

11. The process of freezing a liquid consisting in placing the same in a mixing chamber having a quantity of solidified carbon dioxide therein for creating a pressure in said chamber through sublimation and expansion of said carbon dioxide, discharging said liquid in the form of a spray under the pressure exerted thereon in said mixing chamber, and causing said spray to discharge into a freezing chamber having its atmosphere cooled sufficiently to partially freeze said liquid, and causing said spray to thereafter impinge upon the surface of a quantity of solidified carbon dioxide for further freezing and hardening the same.

12. An apparatus for freezing a liquid comprising a freezing chamber adapted to contain a quantity of a substance which rapidly passes into the gaseous state below the freezing temperature of said substance, and means for discharging the liquid directly upon said substance.

13. An apparatus for freezing a liquid including a freezing chamber, a quantity of solidified carbon dioxide therein, and means for discharging the liquid directly upon the surface of said carbon dioxide.

14. An apparatus for freezing a liquid including a freezing chamber, a substance therein which rapidly changes into the gaseous state below the freezing temperature of said liquid, and means for causing the intermittent spraying of the liquid directly upon said substance.

15. An apparatus for freezing a liquid including a substance which rapidly passes into the gaseous state below the freezing temperature of said liquid, and means for discharging the liquid diagonally against the surface of said substance.

16. Apparatus for freezing a liquid including a freezing chamber adapted to contain a quantity of solidified refrigerant which passes into the gaseous state without immediate liquefaction, a mixing chamber for containing a supply of the liquid to be frozen, means in said last-mentioned chamber for containing a quantity of said refrigerant for producing a pressure therein by sublimation and expansion thereof, and a discharge nozzle through which said liquid may be discharged from said mixing chamber to said freezing chamber by means of said pressure, said nozzle being directed to discharge said liquid upon the surface of said refrigerant in said freezing chamber.

17. An apparatus for freezing a liquid including a freezing chamber and a chamber for containing the liquid to be frozen, a quantity of solidified carbon dioxide in each of said chambers, the solidified carbon dioxide in the second-mentioned chamber causing a pressure to be exerted therein upon sublimation, and means for intermittently permitting the passage of said liquid under pressure against the surface of the solidified carbon dioxide contained in said freezing chamber.

18. An apparatus for freezing a liquid including a freezing chamber and a chamber for containing the liquid to be frozen, a quantity of solidified carbon dioxide in each of said chambers, the solidified carbon dioxide in the second-mentioned chamber causing a pressure to be exerted therein upon sublimation, and a valve operated by the pressure due to sublimation of said carbon dioxide in one of said chambers for controlling the discharge of liquid from the second chamber to the first and causing it to be intermittently sprayed upon the surface of the solidified carbon dioxide of said freezing chamber.

In witness whereof, I have hereunto affixed my signature.

CLARENCE W. VOGT.